United States Patent [19]

Boultinghouse et al.

[11] Patent Number: 4,796,198

[45] Date of Patent: Jan. 3, 1989

[54] METHOD FOR LASER-BASED TWO-DIMENSIONAL NAVIGATION SYSTEM IN A STRUCTURED ENVIRONMENT

[75] Inventors: Karlan D. Boultinghouse, Sandia Park; J. Lee Schoeneman; Bertice L. Tise, both of Albuquerque, all of N. Mex.

[73] Assignee: The United States of America as represented by the United States Department of Energy, Washington, D.C.

[21] Appl. No.: 919,994

[22] Filed: Oct. 17, 1986

[51] Int. Cl.$^4$ ............................................ G01N 21/86
[52] U.S. Cl. ............................... 364/513; 364/424.02; 901/1; 901/47; 180/169; 180/167; 318/587; 250/561; 356/4
[58] Field of Search ................ 364/513, 424; 180/167, 180/168, 169; 318/587; 901/1, 46, 47; 356/1, 4; 250/561

[56] References Cited

U.S. PATENT DOCUMENTS

| | | | |
|---|---|---|---|
| 4,119,900 | 10/1978 | Kremnitz | 318/587 |
| 4,309,758 | 1/1982 | Halsall et al. | 180/169 |
| 4,500,970 | 2/1985 | Daemmer | 364/513 |
| 4,566,032 | 1/1986 | Hirooka et al. | 180/168 |
| 4,615,615 | 10/1986 | Krolak et al. | 356/1 |
| 4,626,995 | 12/1986 | Lofgren et al. | 364/424 |
| 4,638,157 | 1/1987 | Tatsumi | 250/236 |
| 4,647,784 | 3/1987 | Stephens | 901/47 |
| 4,679,152 | 7/1987 | Perdue | 364/513 |
| 4,703,820 | 11/1987 | Reinaud | 356/4 X |
| 4,727,492 | 2/1988 | Reeve et al. | 364/424 |

OTHER PUBLICATIONS

R. A. Jarvis, "Laser Time-of-Flight Range Scanner for Robotic Vision", IEEE Transactions on Pattern Analysis & Machine Intelligence, vol. PAMI-5, No. 5, pp. 505-512, Sep., 1983.
M. W. Siegel, "Solid State Sensors & Robotics", Tech. Digest, IEEE Solid-State Sensor Conf., Jun. 6-8, 1984, pp. 1-2.
Z. Smati et al., "Laser Guidance System for Robots", Central Electricity Generating Bd. Pub., UK, pp. 91-97.
Advertisement, "Nonwire-Guided AGVs", Sensor Tech., A Monthly Intelligence Service, vol. 2, No. 3, p. 7, May, 1986.
R. Chattergy, "Some Heuristics for the Navigation of a Robot", The International Journal of Robotics Research, vol. 4, No. 1, pp. 59-66, Spring, 1985.
J. L. Crowley, "Navigation for an Intelligent Mobile Robot", Laboratory for Household Robots, The Robotics Institute, Carnegie-Mellon Univ., CMU-RI-TR-84-18, Aug., 1984.

Primary Examiner—John R. Lastova
Attorney, Agent, or Firm—Anne D. Daniel; James H. Chafin; Judson R. Hightower

[57] ABSTRACT

A low power, narrow laser beam, generated by a laser carried by a mobile vehicle, is rotated about a vertical reference axis as the vehicle navigates within a structured environment. At least three stationary retroreflector elements are located at known positions, preferably at the periphery of the structured environment, with one of the elements having a distinctive retroreflection. The projected rotating beam traverses each retroreflector in succession, and the corresponding retroreflections are received at the vehicle and focussed on a photoelectric cell to generate corresponding electrical signals. The signal caused by the distinctive retroreflection serves as an angle-measurement datum. An angle encoder coupled to the apparatus rotating the projected laser beam provides the angular separation from this datum of the lines connecting the mobile reference axis to successive retroreflectors. This real-time angular data is utilized with the known locations of the retroreflectors to trigonometrically compute using three point resection, the exact real-time location of the mobile reference axis (hence the navigating vehicle) vis-a-vis the structured environment, e.g., in terms of two-dimensional Cartesian coordinates associated with the environment.

13 Claims, 3 Drawing Sheets

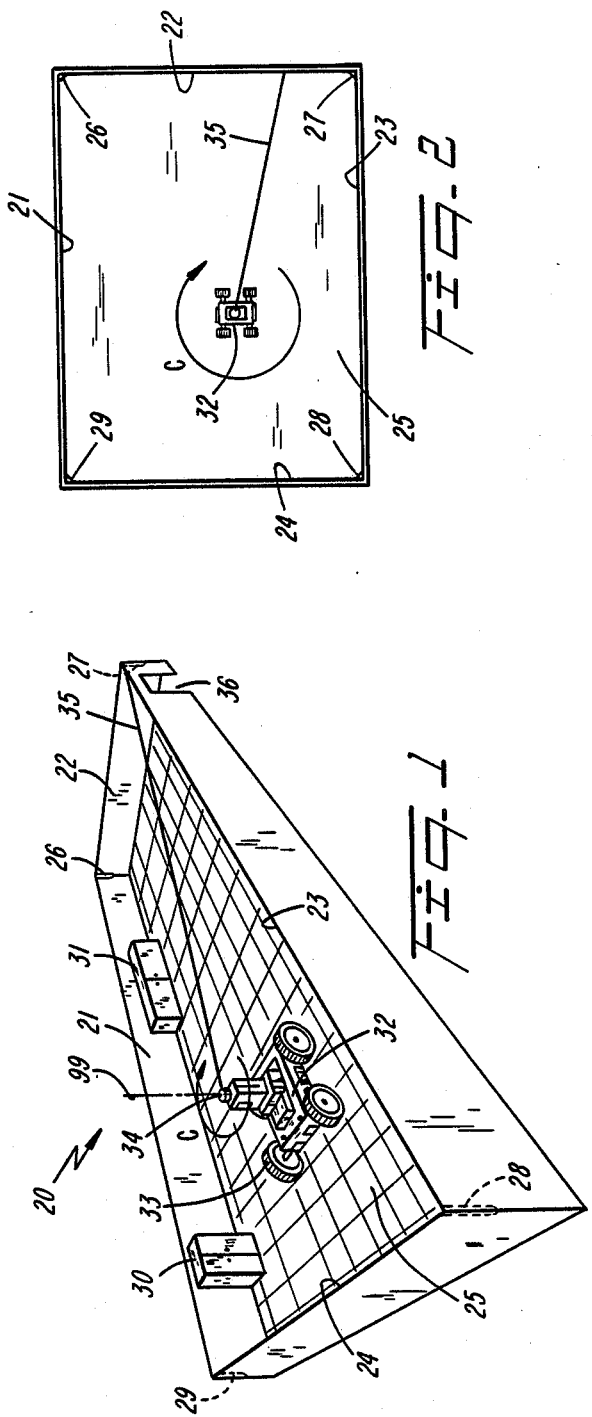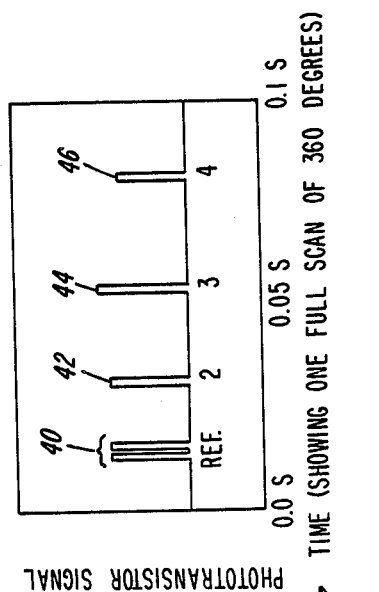

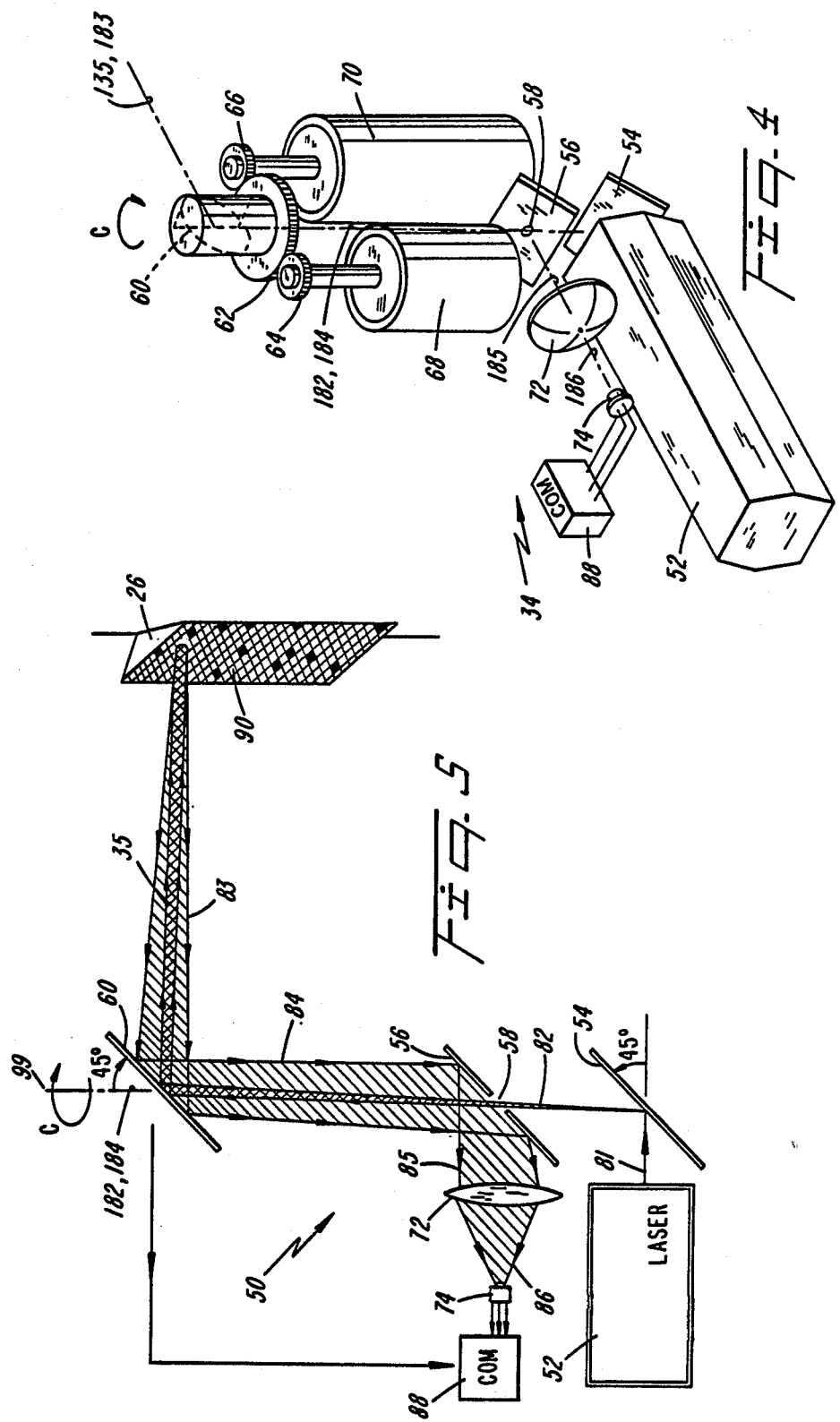

METHOD FOR LASER-BASED TWO-DIMENSIONAL NAVIGATION SYSTEM IN A STRUCTURED ENVIRONMENT

The U.S. Government has rights in the invention pursuant to contract No. DE-AC04-76DP00789 between the U.S. Department of Energy and AT&T Technologies, Inc.

BACKGROUND OF THE INVENTION

1. Field of the Invention

This invention relates generally to a laser-based navigation system, and a method for using the same, that can absolutely locate, in two dimensions, a reference axis of a mobile vehicle within a given structured environment and more particularly, to a mobile, compact and inexpensive laser-based system utilizing a single low-power laser beam for locating a mobile vehicle in terms of two coordinates related to a structured environment.

2. History of the Prior Art

Robot vehicles have found broad acceptance in a variety of fields, e.g., for transporting raw materials, components and finished products in manufacturing facilities, mining equipment, and special purpose vehicles adapted for particularly hazardous situations. In a dramatic example, the nuclear power plant accident at the Chernobyl facility in the U.S.S.R. in 1986 required the use of robot vehicles to carry exploratory test equipment in zones of lethal radiation. As robots find wider acceptance among the public at large, it may reasonably be expected, therefore, that the need for compact and effective robot navigation systems will become significant.

Where robot vehicles generally track the same path repeatedly, e.g., in a factory environment where there is stationary equipment and machinery to be avoided, guidance pathways often are established within or on the tracked floor and sensors mounted on the vehicle are utilized to guide the vehicle along specific pathways. Such systems, however, are relatively inflexible. Also, even if the vehicle moves accurately along a preselected path, difficulties frequently arise if the path is blocked or obstructed.

An alternative approach has been to utilize pulse data generated by the rotation of the vehicle wheels or tracks and processing such data to monitor and correct the path selected by the vehicle with reference to established reference points in the environment. Wear and tear on the equipment of slippage of the vehicle wheels and various extraneous inputs can, however, lead to errors in such systems.

U.S. Pat. No. 4,500,970, to Daemmer, discloses a robot vehicle guidance system which employs both relative motion sensors, to establish movement behavior along a preselected guide path, and relative motion programmed devices with apparatus for initially identifying environmental checkpoints and initially establishing the orientation of the vehicle with respect to these checkpoints. The propulsion system for the robot vehicle is responsive to both the relative motion guidance signals (for intermediate navigation between the checkpoints) and to the vehicle-checkpoint alignment information (to realign the vehicle with respect to the checkpoints). The vehicle carries a sensor array, which can be a series of mechanically operated electrical switches, ultrasound range detectors or any other suitable sensor which detects the proximity of a selected checkpoint, e.g., a wall or a corner between two walls. When the distance between the detector and such a checkpoint is such that all detector outputs are valid, the various outputs are utilized to determine the vehicle alignment with respect to the checkpoint. This information enables the vehicle, when it is caused to depart from its preselected path by extraneous factors, to take corrective measures and compensate for any incidental deviations in its motion.

An alternative approach is disclosed in U.S. Pat. No. 4,119,900, to Kremnitz, as particularly suitable for the automatic orientation and control of a robot operating on a surface, e.g., an area to be vacuum cleaned or a lawn to be mowed. This device employs a plurality of distance-measuring devices, which continuously and repeatedly measure distances from the robot to points or small surface areas defining the surface to be worked. Electro-optical distance measuring devices are utilized in the far range, electro-acoustical devices are utilized in the close range, and electro and/or mechanical means are utilized within contact range. The various distance measuring device continuously ascertain values of distance, which are then provided to a data processor which transforms the same into digital control signals for the drive means and for tools carried by the robot. The robot thus plans its own driving and working strategies as the result of changing distance measurements.

Both the Daemmer and Kremnitz systems are relatively complex. For many applications it is necessary and, in fact, sufficient to know the exact location of the navigation system and the vehicle on which it is mounted within a two-dimensional framework related to a structured environment, e.g., a large substantially flat area over which the vehicle travels. A need therefore exists for a small, compact, low-cost navigation system that can operate relatively independently of extraneous influences in two-dimensions.

SUMMARY OF THE INVENTION

Accordingly it is an object of this invention to provide apparatus for precisely locating itself in a two-dimensional frame of reference related to a structured environment.

It is another object of this invention to provide a compact, inexpensive, and mobile system mountable on or in a vehicle for precise location thereof in a two-dimensional frame of reference related to a structured environment within which the vehicle operates.

It is a further object of this invention to employ a laser beam, projected from navigation apparatus carried on a mobile vehicle and interacting with elements of a structured environment, to provide navigation data precisely locating the vehicle in a two-dimensional frame of reference related to the structured environment.

It is a related object of this invention to provide a method for precisely locating a mobile vehicle in a structured environment.

It is a further related object of this invention to provide a method for employing a low power laser beam source mounted on a mobile vehicle navigating in a structured environment to precisely locate the vehicle in real-time coordinates referred to a stationary frame of reference.

These and other objects and advantages of this invention are realized by providing in a laser-based navigation system, capable of locating a vehicle in a two-dimensional coordinate frame of reference within a structured environment, at least three stationary retroreflective elements spaced-apart from each other at known coordinates in the two-dimensional coordinate frame of reference with one of these retroreflective elements having a distinctive retroreflection; a mobile laser source supported by a mobile vehicle for projecting a mobile narrow laser beam rotating about a mobile system-reference axis normal to the two-dimensional coordinate frame of reference, so that the mobile rotating laser beam sequentially interacts with the stationary retroreflective elements for retroreflections thereat; a photoelectric element connected to the mobile laser source generating first output signals responsive to the retroreflections from the stationary retroreflective elements; laser beam angular position determining azimuth means for generating second output signals corresponding to updated angular positions of the projected laser beam when it is retroreflected, these positions being measured relative to a datum corresponding to the position of the distinctive retroreflective element; and data storage and signal processing elements for converting updated data on the angular position of the rotating beam corresponding to each of the first output signals to compute the real-time location coordinates of the system in the stationary two-dimensional frame of reference. The navigation system of this invention, therefore, continuously and swiftly updates data on the angles subtended by lines between itself and stationary spaced-apart retroreflective elements at known locations to generate real-time data on its location within a two-dimensional frame of reference.

DESCRIPTION OF THE DRAWINGS

FIG. 1 is a perspective view of a robot vehicle equipped with the present invention and located within a typical structured environment defined by four intersecting walls.

FIG. 2 is a plan view of the environment of FIG. 1, with the guided vehicle in a somewhat altered position therewithin.

FIG. 3 is a graphical depiction of the phototransistor output signals plotted against time, for one full 360° scan of the laser beam of this invention.

FIG. 4 is a perspective view of the essential coacting elements of this invention that are carried by the guided robot vehicle.

FIG. 5. is a schematic depiction of the pathways traversed by the laser beam from its source on the guided vehicle, to a typical retroreflector and back to the equipment on the vehicle.

DESCRIPTION OF THE PREFERRED EMBODIMENT

Figure 11:
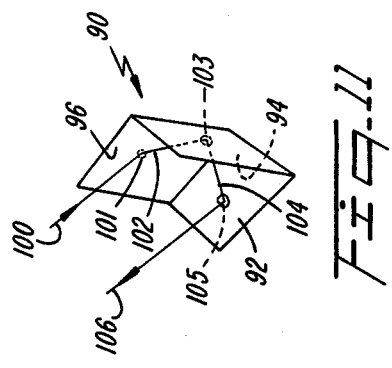
FIG. 11 is a schematic perspective view of a portion of one retroreflective cell in a typical retroreflective element suitable for use with this invention.

The laser-based navigation system of this invention, as best seen with reference to FIG. 1, is most advantageously utilized within a structured environment 20 to generate constantly updated, i.e., real-time information on the exact location of a mobile vehicle 32 operated within the structured environment 20. The navigation system itself has at least three stationary retroreflective elements, as typified by elements 26, 27, 28 and 29, conveniently located at the corners of intersecting walls 21, 22, 23 and 24 which define an exemplary four-sided structured environment 20 in FIG. 1. The mobile components of the navigation system are advantageously carried on a typical vehicle 32, provided with steerable wheels 33, and having at least a portion of the vehicle, i.e., rotating turret 34, at a height sufficient to permit line-of-sight free laser beam transmission between turret 34 and retroreflective elements 26-29. In principle, rotating turret 34 should be located at a height such that line-of-sight transmissions between it and the retroreflective elements 26-29 are not obstructed by incidental structures, such as 30 and 31 in FIG. 1.

A retroreflective element, e.g., 26, most conveniently takes the form of a strip of material that has the characteristics of reflecting incident light directly back to the source for any reasonable angle of incidence. The material used may be crystalline, in the form of a coating on a flat base, e.g., certain highly visible traffic signs, roadway divider strips, and highly reflective tags applied to runners or children's garments to make the wearers visible under conditions of poor lighting.

In principle, the crystalline material most commonly used to obtain retroreflectivity utilizes internal reflection at multiple crystalline faces, as best understood with reference to FIG. 11. A portion 90 of such crystalline material, having multiple faces, receives an incident ray of light 100. Ray 100 is internally reflected at face 96 at point 101 to generate a first reflected ray 102 which is then re-reflected at point 103 of face 94 to generate a twice reflected ray 104, which is reflected again at point 105 of yet another face 92 to be then returned as retroreflected ray 106 very close to and substantially parallel to incident ray 100. A carefully focused narrow laser beam may therefore be visualized as a bundle of individual rays such as 100 which are retroreflected as rays 106 virtually in the reverse direction.

As seen in the plan view of FIG. 2, the mobile portion of this navigation system utilizes rotating turret 34 to sequentially project a mobile rotating narrow laser beam 35 at retroreflective elements 26-29, maintained stationary at known locations in the structured environment, once per rotation. Each such encounter generates a retroreflected brief laser beam transmission which travels backward along the outwardly projected narrow laser beam 35. The direction of rotation C of the turret is arbitrary, and is shown as being clockwise in FIG. 2.

Most working environments comprise partitions, walls, or other similar divisions that are generally flat and relatively extensive in length. It is, therefore, usually most convenient for navigation purposes to visualize a two-dimensional Cartesian coordinate system having a principal axis aligned with a principal wall defining the structured environment. Once such a coordinate reference frame is selected, the locations of the various retroreflective elements are definable in terms of paired coordinate values which are utilized to determine the instantaneous coordinate values for the location of the mobile reference axis of rotation 99 about which laser beam 35 rotates, preferably to describe a horizontal plane.

As best seen in FIG. 4, turret 34 carried on mobile vehicle 32 conveniently houses various coacting elements that generate the outwardly projected laser beam 35 and also receive retroreflected signals from retroreflective elements 26–29. Initially, a laser 52, e.g., the Spectra-Physics Model 155A, Class II He-Ne laser, provides an initial laser beam in a horizontal direction, which is reflected with a 90° rotation at mirror surface 54, projected through aperture 58 in mirror surface 56, is then reflected with a complementary 90° rotation at rotating mirror surface 60 to be projected outwardly along an axis of symmetry 135 of narrow laser beam 35, and is retroflected back along an axis of symmetry 183 (coincident with axis 135) as retroreflected beam 83. This retroflected beam 83 is reflected at rotating mirror surface 60 and at mirror surface 58 to be directed along an axis of symmetry 185 through lens 72 along coincident axis of symmetry 186 to photoelectric element 74, such as a Motorola MRD 370 phototransistor, for the generation of corresponding first signals thereby. Each of these signals is indicative of the traverse of outwardly projected laser beam 35 across one of the retroreflective elements 26–29.

Persons skilled in the art will appreciate that laser beams can be very tightly focused and will maintain essential parallelism of the beam over vast distances, but that since the laser beam has a Gaussian nature (and since no reflector is perfect) any reflection of a laser beam inevitably results in some diffusion of the beam, i.e., the repeatedly reflected laser beam will show some divergence with each reflection.

The laser beam provided by the laser source identified above typically has an initial beam width of 0.9 mm and the characteristic helium-neon wavelength of 6,328 angstroms. Its total power output is 0.5 mW or less, making it particularly suitable for use in environments where occasional human contact can be expected. Other narrow-beam lasers, e.g., IR, $CO_2$, YAG, etc., may be utilized instead of a He-Ne laser, and each will have its own characteristics.

Aperture 58 in mirror 56 needs to be only of the order of approximately 2 mm in diameter to permit uninterrupted passage of once-reflected laser beam 82. It is intended that the axis of symmetry 182 of once-reflected laser beam 82 be coincident with reference axis 99.

For analytical and computational reasons, as made clear hereinbelow, it is necessary that one of the retroreflective elements be distinguished from the rest. One simple and convenient solution, of many that will occur to persons skilled in the art, is to have one of the retroreflective elements as a double strip. As best seen with reference to FIG. 3, the consequence of thus providing one distinctive retroreflective element is that the first signals generated by photoelectric element 74, for one complete 360° rotation of outwardly projected laser beam 35, is a double signal 40 for the distinctive retroreflective element, followed by sequential signals 42, 44 and 46, for a structured environment provided with four retroreflective elements. It is important to note that the intensity of the retroreflected signal is neither measured nor utilized in a quantitative sense in this invention. Hence, within rather broad limits, set mainly by the sensitivity of photoelectric element 74, any of the retroreflectors 26–29 may be quite far from the mobile vehicle and the ambient atmosphere need not be very clear, i.e., the system can navigate, for example, inside a large airplane hangar on a foggy morning.

Once retroreflective elements 26–29 have been located in the structured environment, and a suitable reference coordinate system has been selected, the precise coordinates locating the retroreflective elements become known constants. The exact instantaneous location coordinates of a mobile vehicle carrying the mobile elements of this invention are the unknowns that have to be determined. Encounters between outwardly projected rotating narrow laser beam 35 and the various retroreflective elements generate a set of corresponding measurable angles that can be utilized, as discussed more fully below, to compute the exact location coordinates of reference axis 99 in real time. Specifically, measurements are made of the angles subtended at reference axis 99 by pairs of adjacent retroreflective elements 26–29. Since, in principle, all such angles vary as vehicle 32 moves within structured environment 20, it is important to have a single datum or reference line from which such angles are measured during each 360° rotation of beam 35. This is most conveniently effected by utilizing the distinctive retroreflective signal 40 (see FIG. 3) as a changing but constantly updated datum. Thus, all other angles subtended at reference axis 99 by adjacent pairs of retroreflective elements 26–29 are measured from an updated datum line connecting axis 99 to the single deliberately distinctive retroreflective element that generates signal 40.

The hardware to provide rotation to reflective mirror 60 most conveniently comprises an electric motor 68 having a gear 64 that meshes with another gear 62 coaxial with reference axis 99 to turn mirror 60, as indicated by curved arrow C. Motor 68 may conveniently be a simple DC drive motor, e.g., a 12 volt TRW model 100A108-6 DC motor, and ears 64 and 62 may conveniently be selected to provide a speed reduction factor of 8 to 1. A gear 66, also meshing with gear 62, is conveniently connected to an angle encoder 70, e.g., Vernitech Model DOE-30, 4-turn, binary output, optical absolute encoder with a total count of 4096. A convenient gear ratio between gear 62 and 66 is one that requires the encoder to turn four times for each turn of mirror 60. Each count of the Vernitech encoder represents 0.08789°, yielding a maximum resolution of 5.3 minutes of arc.

As indicated in FIG. 5, electrical signals from photoelectric cell 74 and from angle encoder 70 are provided to a computer module 88, which comprises an adequate microprocessor unit and magnetic storage to store sufficient incoming and processed data to compute the location coordinates of the mobile vehicle. During use, therefore, when photoelectric cell 74 detects the distinctive signal 40 corresponding to a distinctive retroreflector encountered by rotating narrow laser beam 35, measurement of angles corresponding to the successively encountered retroreflector elements is obtained from encoder 70 and stored. This activity is performed for each rotation of laser beam 35. Obviously, as persons skilled in the art will readily appreciate, the rotational speed of laser beam 35 is limited only by the time required for the microprocessor of computer module 88 to perform the necessary calculations. In practice, it is thus possible to perform calculations rapidly enough to provide information on the location coordinates of a moving vehicle within a 50'×50' structured environment to an accuracy of approximately 1".

Figure 6:
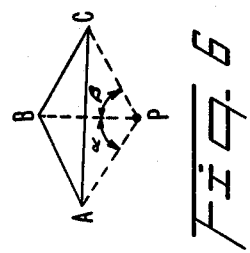

Trigonometric factors require that there be information on the distances between adjacent ones of at least three points and information on the angles subtended by two pairs formed of such three points at the object whose location vis-a-vis these three points is to be determined. This is best understood with reference to FIGS. 6–8. In the scenario of FIG. 6, point P represents the mobile reference axis the coordinates of which are to be determined in the two-dimensional coordinate plane defined by points A, B and C, and the required information must include the known position coordinates of points A, B and C as well as the angle α formed by points A and B with point P and the angle β formed by the points B and C with point P. Note that in the scenario of FIG. 6 point P is on the opposite side of line A-C from vertex B between A and C.

Figure 10:
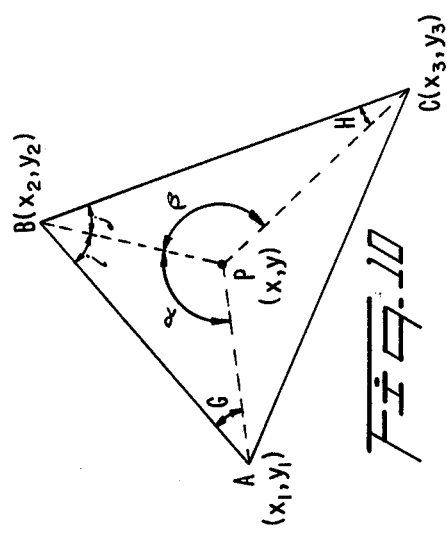
FIGS. 9 and 10 are enlarged views of FIGS. 6 and 7, respectively, with additional reference symbols provided.
Figure 7:
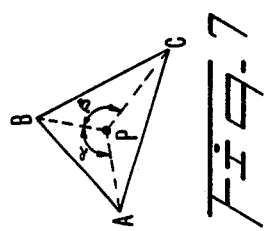
Figure 9:
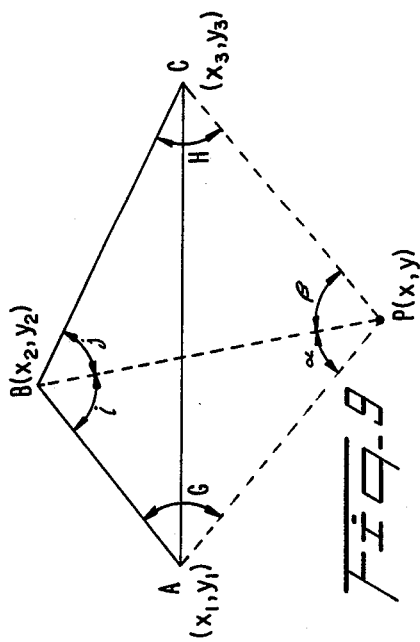

In another positional scenario, as best seen in FIG. 7, point P, whose location is to be determined in the plane of points A, B and C, is located within the triangle formed by lines joining adjacent pairs of the points A, B and C. FIGS. 9 and 10, respectively, are enlarged versions of FIGS. 6 and 7, with additional angular information displayed thereon.

Figure 8:
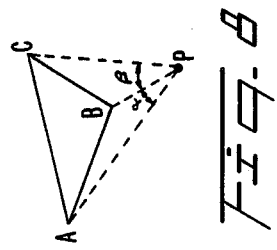
FIGS. 6, 7 and 8 geometrically depict three alternative scenarios in which a guided vehicle may find itself located vis-a-vis three stationary points in a structured environment.

The geometric scenario of FIG. 8, wherein the point P whose location is to be determined vis-a-vis points A, B and C is located on the same side as vertex B with respect to side AC, is trigonometrically more complex to solve. However, it will be appreciated that if the retroreflectors are disposed at the corners of defining walls or boundaries of a structured environment, only the scenarios depicted in FIGS. 6 and 7 will be encountered in practice. In other words, if at least two of the lines AB, BC and AC are coincident with the boundaries of a structured environment, only the trigonometric solutions applicable to the cases of FIGS. 6 and 7 (virtually the same) are of practical interest. In the scenario of FIG. 8, the point P whose location is to be determined vis-a-vis points A, B and C is, in effect, outside the structured environment.

The geometric problem to be solved here occurs frequently in surveying, and is referred to as the "three-point resection problem". The exemplary program listing below provides a suitable algorithm for the solution of such a resection problem for the cases of FIGS. 6 and 7. As will be appreciated by reference to FIG. 2, although the direction of rotation of laser beam 35 is arbitrarily chosen, by the specific choice of a clockwise direction, indicated by curved arrow C, it is logically consistent to letter the stationary locations of retroreflective elements A, B and C in the same clockwise manner in FIGS. 9 and 10. As noted earlier, if the retroreflective elements are restricted to corners or very near corners of a room, any point within the enclosed room will fall within the scenarios of either FIGS. 6 or 7.

The basic information available and required to accomplish the calculations includes, in a Cartesian coordinate system, the X and Y coordinates for each of the points A, B and C. Given this data the length of sides AB, BC and AC are derived by the application of Pythagoras' theorem. The "law of cosines" is then used to calculate the angle ABC which is stored, at step 165 of the program listing provided below, as IPJ. The next step involves the calculation of angles G and H, these being the respective angles BAP and BCP in both FIGS. 9 and 10. Note that angles α and β have been determined from the angle encoder. Therefore the sum of angles G and H is given by:

$$G+H = 2*PI - ALPHA - BETA - IPJ \quad \text{(Eq. 1)}$$

Then, $(G-H)/2$ is determined from the following:

$$(G-H)/2 = Arctan(Tan(0.5*(G+H))*Cot)PI/4 + Arctan((B*Sin(Beta))/(A*Sin(Alpha))))) \quad \text{(Eq. 2)}$$

This is step 241 in the algorithm of Appendix I.

The quantity $(G+H)/2$ is calculated simply by dividing the quantity $(G+H)$, formed from Equation 1, by 2. Note that Equation 2 has provided $(G-H)/2$, and the sum of $(G+H)/2$ and $(G-H)/2$ is simply G. Upon obtaining G, H may be readily obtained from Equation 1. Once angles G and H are computed and the respective azimuths M1 and M2, of lines AB and BC, respectively, are known, the values of coordinates X and Y for the point P of interest are readily found from the following:

$$X = (M3*X1 - M4*X3 + Y1 - Y1)/(M3 - M4) \quad \text{(Step 370) Eq. 3}$$

$$Y = (M3*(X-X1) + X1) \quad \text{(Step 380) Eq. 4}$$

It should be noted that this program will provide accurate solutions unless the point P to be located is very close to a circle through points A, B and C.

This invention provides a very compact, light, inexpensive, fast-acting and safe apparatus for the location of a mobile vehicle within a structured environment. All the necessary computations are simple and either trigonometric or quadratic in nature and can be performed by relatively simple microprocessors. Likewise, with a low power laser, the apparatus should be safe to use where human encounters are likely.

The present invention has been particularly described in conjunction with the drawings attached hereto, and it is expected that other and further modifications may be made to the device by persons skilled in the art acting within the spirit and scope of the invention. All such modifications are intended to be comprehended within this invention as limited only by the claims appended hereunder.

We claim:

1. A laser-based mobile navigation system, capable of locating a mobile vehicle in a two-dimensional coordinate frame of reference in a structured environment, said system comprising:

at least three stationary retroreflective elements spaced apart from each other at known coordinates in said two-dimensional coordinate frame of reference, one of said retroreflective elements having a distinctive retroreflection;

mobile laser source means supported by said mobile vehicle for projecting a mobile narrow laser beam rotating about a mobile reference axis normal to the two-dimensional coordinate frame of reference, whereby said mobile rotating laser beam sequentially interacts with said retroreflective elements to generate corresponding retroreflections therefrom;

retroreflection responsive signal generating and receiving means connected to said mobile laser source means, responsive to the retroreflections from said stationary retroreflective elements, for generating output signals corresponding to each retroreflection, including said distinctive retroreflection, for receiving input signals corresponding to each retroreflection, including said distinctive retroreflection, and for measuring angles corresponding to said sequentially encountered retroreflector element, with respect to a current datum corresponding to said distinctive retroreflection; and computation means cooperating with said signal generating and receiving means for computing from said known coordinates of said retroreflective elements and said output signals, by three-point resection, the real-time coordinates of said mobile reference axis in said two-dimensional coordinate frame of reference.

2. A laser-based mobile navigation system, capable of locating a mobile vehicle in a two-dimensional coordinate frame of reference in a structured environment, said system comprising:
- at least three stationary retroreflective elements spaced apart from each other at known coordinates in said two-dimensional coordinate frame of reference, one of said retroreflective elements having a distinctive retroreflection;
- mobile laser source means supported by said mobile vehicle for projecting a mobile narrow laser beam rotating about a mobile reference axis normal to the two-dimensional coordinate frame of reference, whereby said mobile rotating laser beam sequentially interacts with said retroreflective elements to generate corresponding retroreflections therefrom;
- a photoelectric element connected to said mobile laser source means, responsive to the retroreflections from said stationary retroreflective elements, generating first output signals corresponding to each retroreflection, including said distinctive retroreflection;
- azimuth means connected to said mobile laser source means for determining current angular positions of said mobile projected laser beam corresponding to each of said first output signals, said current angular positions being measured with respect to a current datum corresponding to said distinctive retroreflection, and for generating updated second output signals indicating said current angular positions;
- data storage means cooperating with said mobile laser source means for storing said known coordinates of said retroreflective elements and said updated second output signals; and
- computation means cooperating with said data storage means for computing from said stored known coordinates of said retroreflective elements and said updated second output signals, by three-point resection, the real-time coordinates of said mobile reference axis in said two-dimensional coordinate frame of reference.

3. A laser-based navigation system according to claim 2, wherein:
said mobile laser source means comprises rotating means for redirecting laser beams, rotating about said mobile reference axis such that a non-rotating laser beam parallel to said mobile reference axis is received by said rotating means and is redirected to be a rotating beam projected substantially radially outward of said mobile reference axis while radially inwardly directed incident retroreflections of said rotating beam are redirected to be substantially parallel to said mobile reference axis.

4. A laser-based navigation system according to claim 3, wherein:
said laser source means further comprises an apertured mirror inclined at 45° to said mobile reference axis, said apertured mirror being formed with an aperture large enough to pass therethrough said non-rotating laser beam parallel to said mobile reference axis and directed to be received by said rotating means, said aperture also being smaller than the cross-section of said retroreflection redirected by said rotating means to be substantially parallel to said mobile reference axis, whereby a portion of said redirected retroreflection is finally reflected by said apertured mirror toward said photoelectric element.

5. A laser-based navigation system according to claim 4, further comprising:
laser beam focusing means for focusing said finally reflected redirected retroreflection onto a portion of said photoelectric element.

6. A laser-based navigation system according to claim 3, wherein:
said azimuth means comprises an angle encoder.

7. A laser-based navigation system according to claim 6, wherein:
said angle encoder is rotatably connected to said rotating means to rotate at a predetermined speed ratio therewith.

8. A laser-based navigation system according to claim 2, wherein:
said mobile narrow rotating beam is powered at a level low enough as to be harmless to a human being exposed thereto.

9. A laser-based navigation system according to claim 8, wherein:
said laser source means comprises a He-Ne laser.

10. A method for laser-based locating of a mobile vehicle in a two-dimensional coordinate frame of reference associated with a structured environment, comprising the steps of:
- locating at least three stationary retroreflective elements spaced apart from each other at known coordinates in said two-dimensional coordinate frame of reference, one of said retroreflective elements having a distinctive retroreflection;
- projecting from laser source means mounted on said mobile vehicle a mobile narrow laser beam rotating about a mobile reference axis normal to the two-dimensional coordinate frame of reference, whereby said mobile rotating laser beam sequentially interacts with said retroreflective elements to generate corresponding retroreflections therefrom;
- receiving the retroreflections from said stationary retroreflective elements at the mobile vehicle, measuring angles corresponding to said sequentially encountered retroreflector elements, with respect to a current datum corresponding to said distinctive retroreflection, and generating therefrom output signals corresponding to each retroreflection including said distinctive retroreflection; and
- computing from said known coordinates of said retroreflective elements and said output signals, by three-point resection, the real-time coordinates of said mobile reference axis in said two-dimensional coordinate frame of reference.

11. A method for laser-based locating of a mobile vehicle in a two-dimensional coordinate frame of reference in a structured environment, comprising the steps of:
- locating at least three stationary retroreflective elements spaced apart from each other at known coordinates in said two-dimensional coordinate frame of reference, one of said retroreflective elements having a distinctive retroreflection;
- projecting from laser source means mounted on said mobile vehicle a mobile narrow laser beam rotating about a mobile reference axis normal to the two-dimensional coordinate frame of reference, whereby said mobile rotating laser beam sequentially interacts with said retroreflective elements to generate corresponding retroreflections therefrom;

receiving the retroreflections from said stationary retroreflective elements at a photoelectric element connected to said laser source means, and generating therefrom first output signals corresponding to each retroreflection, including said distinctive retroreflection;

determining current angular positions of said mobile projected laser beam corresponding to each of said first output signals by azimuth means connected to said laser source means, said current angular positions being measured with respect to a current datum corresponding to said distinctive retroreflection, and for generating updated second output signals indicating said current angular positions;

storing said known coordinates of said retroreflective elements and said updated second output signals; and computing from said known coordinates of said retroreflective elements and said updated second output signals, by three-point resection, the real-time coordinates of said mobile reference axis in said two-dimensional coordinate frame of reference.

12. A method according to claim 11, wherein:
said projected rotating laser beam is powered at a low level so that interception thereof by human beings will not cause them harm.

13. A method according to claim 11, wherein:
said projected laser beam is a He-Ne laser beam.

* * * * *